US008965702B2

(12) United States Patent
Tabarovsky et al.

(10) Patent No.: US 8,965,702 B2
(45) Date of Patent: Feb. 24, 2015

(54) FORMATION RESISTIVITY MEASUREMENTS USING MULTIPLE CONTROLLED MODES

(75) Inventors: Leonty A. Tabarovsky, Cypress, TX (US); Stanislav W. Forgang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 482 days.

(21) Appl. No.: 13/359,563

(22) Filed: Jan. 27, 2012

(65) Prior Publication Data

US 2013/0024119 A1   Jan. 24, 2013

Related U.S. Application Data

(60) Provisional application No. 61/469,878, filed on Mar. 31, 2011.

(51) Int. Cl.
*G01V 1/40* (2006.01)
*G01V 3/00* (2006.01)
*G01V 3/26* (2006.01)

(52) U.S. Cl.
CPC ........................................ *G01V 3/26* (2013.01)
USPC .............................................. 702/7; 324/355

(58) Field of Classification Search
USPC ........... 702/7, 1–2, 11, 16, 57, 64–67, 72–73, 702/75, 81, 127, 188–189; 324/323, 324/347–348, 351, 354–355, 357, 363, 324/366–368; 73/152.01–152.02, 152.17
See application file for complete search history.

(56) References Cited

U.S. PATENT DOCUMENTS

| | | | |
|---|---|---|---|
| 3,579,098 A | 5/1971 | Mougne |
| 4,019,125 A | 4/1977 | Daniel |
| 4,837,518 A | 6/1989 | Gard et al. |
| 5,056,067 A | 10/1991 | Drumheller |
| 5,869,968 A | 2/1999 | Brooks et al. |
| 6,225,806 B1 | 5/2001 | Millar et al. |
| 7,119,544 B2 | 10/2006 | Hayman et al. |

(Continued)

OTHER PUBLICATIONS

L. San Matin et al, Oil-Based Mud Imaging Tool Generates High Quality Borehole Images in Challenging Formation and Borehole Condition, Including Thin Beds, Low Resistive Formations, and Shales, Conference Paper, May 25-28, 2008, 5 pages, Society of Petrophysicists and Well-Log Analysts.

(Continued)

*Primary Examiner* — Toan Le
(74) *Attorney, Agent, or Firm* — Cantor Colburn LLP (57) ABSTRACT

Disclosed is an apparatus for estimating a property of an earth formation penetrated by a borehole. The apparatus includes a plurality of electrodes disposed downhole and configured to inject an electrical current into the earth formation using an applied voltage and/or measure electrical current resulting from an injection of the electrical current. The apparatus also includes a processor configured to perform a series of formation measurements that include injecting current into the earth formation using a unique subset of electrodes in the plurality of electrodes and measuring current in the earth formation using one or more electrodes not used for the current injecting. The processer sums the measured currents for the electrodes wherein the sum of electrical currents for at least one electrode that measured electrical current is substantially in phase with the applied voltage; and uses the sum of in phase currents to estimate the property.

19 Claims, 8 Drawing Sheets

(56) References Cited

U.S. PATENT DOCUMENTS

| | | | |
|---|---|---|---|
| 2001/0043066 A1 | 11/2001 | Hawkes et al. | |
| 2002/0153897 A1 | 10/2002 | Evans et al. | |
| 2003/0122547 A1 | 7/2003 | Prammer | |
| 2004/0046559 A1 | 3/2004 | Flanagan | |
| 2005/0067190 A1 | 3/2005 | Tabanou et al. | |
| 2005/0068036 A1 | 3/2005 | Wang et al. | |
| 2006/0055418 A1 | 3/2006 | Ogilvy et al. | |
| 2007/0239403 A1 | 10/2007 | Hornbostel | |
| 2007/0285073 A1 | 12/2007 | Nishida | |
| 2008/0040042 A1 | 2/2008 | Page | |
| 2009/0072833 A1 | 3/2009 | Tabarovsky | |
| 2009/0306896 A1* | 12/2009 | Forgang et al. | 702/7 |

OTHER PUBLICATIONS

Lofts, J., A New Micro-Resistivity Imaging Device for Use in Oil-Based Mud, Conference Paper, 2002, 14 pages, Society of Petrophysicists and Well-Log Analysts.

Mezzatesta A.G. et al, Integrated 2-D Interpretation of Resistivity Logging Measurements by Inversion Methods, Conference Paper, 1995, 8 pages, Society of Petrophysicists and Well-Log Analysts.

Mezzatesta A.G. et al, Integrated Interpretation of Galvanic and Induction Measurements by Inversion Methods, Conference Paper, Mar. 11-14, 1995, 9 pages, Society of Petroleum Engineers.

Mezzatesta, A.G. et al, Simultaneous Inversion of Galvanic and Induction Logging Measurements to Improve Resolution, Conference Paper, Apr. 27-29, 1994, 15 pages, Society of Petroleum Engineers.

Notification of Transmittal of the International Search Report and the Written Opinion of the International Searching Authority, or the Declaration; PCT/US2012/031419; Oct. 31, 2012.

Notification of Transmittal of the International Search Report and the Written Opinion of the International Searching Authority, or the Declaration; PCT/US2012/031421; Oct. 31, 2012.

Notification of Transmittal of the International Search Report and the Written Opinion of the International Searching Authority, or the Declaration; PCT/US2012/031424; Nov. 1, 2012.

Notification of Transmittal of the International Search Report and the Written Opinion of the International Searching Authority, or the Declaration; PCT/US2011/058113; Jun. 29, 2012.

\* cited by examiner

FORMATION RESISTIVITY MEASUREMENTS USING MULTIPLE CONTROLLED MODES

CROSS REFERENCE TO RELATED APPLICATIONS

This application claims the benefit of an earlier filing date from U.S. Provisional Application Ser. No. 61/469,878 filed Mar. 31, 2011, the entire disclosure of which is incorporated herein by reference.

BACKGROUND

1. Field of the Invention

The present invention relates to the analysis of underground earth formations, and, more particularly, to the determination of formation resistivity.

2. Description of the Related Art

Boreholes are drilled into the earth for many applications such as hydrocarbon production, geothermal production, and carbon sequestration. In order to efficiently use expensive resources drilling the boreholes, it is important for analysts to acquire detailed information related to the geologic formations being drilled.

Resistivity imaging is one type of process for obtaining the detailed information. In resistivity imaging, both electrical and induction resistivity instruments can be used. The resistivity of a formation is measured as a function of depth using a resistivity tool disposed in a borehole penetrating the formation. Variations in the resistivity are plotted or displayed to provide an image of the formation.

In electrical resistivity imaging, one or more transmitter electrodes are used to inject an electric current into an earth formation. Measurement electrodes, sometimes referred to as button electrodes, then perform electrical measurements that are used to determine the resistivity of the earth formation. Because the transmitter and transmitter electrodes are deployed in a drilled borehole having small variations in diameter due to the drilling process, the electrodes may not make contact with the borehole wall. The space or distance between an electrode and the borehole wall is referred to as the "standoff." Unfortunately, when using oil-based drilling mud, if the drilling mud enters a standoff, erratic images can be acquired. It would be well received in the art if the quality of resistivity images could be improved when using oil-based drilling mud.

BRIEF SUMMARY

Disclosed is an apparatus for estimating a property of an earth formation penetrated by a borehole. The apparatus includes a plurality of electrodes disposed downhole and configured to inject an electrical current into the earth formation using an applied voltage and/or measure electrical current resulting from an injection of the electrical current. The apparatus also includes a processor configured to perform a series of formation measurements that include injecting current into the earth formation using a unique subset of electrodes in the plurality of electrodes and measuring current in the earth formation using one or more electrodes not used for the current injecting. The processor sums the measured currents for the electrodes wherein the sum of electrical currents for at least one electrode that measured electrical current is substantially in phase with the applied voltage; and uses the sum of in phase currents to estimate the property.

Also disclosed is a method for estimating a property of an earth formation penetrated by a borehole. The method includes: conveying a carrier through the borehole where the carrier has a plurality of electrodes configured to inject an electrical current into the earth formation using an applied voltage and/or measure electrical current resulting from injections of the electrical current. The method further includes performing a series of formation measurements using a processor where each formation measurement includes: injecting electrical current into the earth formation using a unique subset of electrodes in the plurality of electrodes and measuring electrical current in the earth formation using one or more electrodes in the plurality of electrodes not used for the injecting electrical current in the formation measurement. The method further includes summing the electrical currents measured for each electrode that measured electrical current wherein the sum of electrical currents for at least one electrode that measured electrical current is substantially in phase with the applied voltage and using the sum of electrical currents that are substantially in phase with the applied voltage to estimate the property.

Further disclosed is a non-transitory computer readable medium having computer executable instructions for estimating a property of an earth formation penetrated by a borehole by implementing a method that includes: injecting electrical current into the earth formation using a unique subset of electrodes in a plurality of electrodes disposed in the borehole; measuring electrical current in the earth formation using one or more electrodes in the plurality of electrodes not used for the injecting electrical current in the formation measurement; summing the electrical currents measured for each electrode that measured electrical current wherein the sum of electrical currents for at least one electrode that measured electrical current is substantially in phase with the applied voltage; and using the sum of electrical currents that are substantially in phase with the applied voltage to estimate the property.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Resistivity imaging instruments operating in boreholes filled with non-conductive oil-based drilling fluid conduct measurements using alternating current to overcome impedance introduced by both "standoff" and mud invasion zone. The currents are injected by transmitter electrodes driven by a voltage source at frequency $f=\omega/2\pi$. Measurements are based on the sensing of that component of electric current flowing through the measurement electrodes that is in-phase with the signal of the voltage source. By convention, this in-phase component of the measured current is called the "real" component of the measured current. In addition, by convention, electrode separation from the borehole wall together with the above-mentioned invasion zone is referred to as tool "standoff." The electrode separation and the invasion zone are electrically connected in series and they both present high impedance to injected electrical current prior to it entering the geologic formation. Uneven standoffs of transmitter and measurement electrodes in a resistivity tool can cause erratic resistivity images in oil-based drilling mud. In some cases, the most severe distortion of images occurs when button electrodes used to receive electric current from a formation experience uneven standoff between themselves.

Different standoffs between the measurement electrodes cause strong cross currents between the measurement electrodes that primarily affect the phase of the measured current. Alteration of the phase results in a leakage of the non-informative imaginary component of the current into the real component of the current, hence, causing inaccurate or erratic measurements of the resistivity.

While the tool is operating in oil-based mud, the different standoffs cause the strong cross-currents because voltage differentials between individual measurement electrodes and the formation become unequal. The unequal voltage differentials cause potential (i.e., voltage) differences between areas of the borehole surface located in front of the measurement electrodes. The cross-currents flow as a result of those potential differences.

For the same reasons described above, while the tool is operating in oil-based mud with the transmitter electrodes having different standoffs, cross-currents can flow between those electrodes and also affect the measurement of the resistivity.

The techniques disclosed herein for improving the accuracy and precision of resistivity measurements call for equalizing the potentials of the areas located in front of the measurement electrodes and the transmitter electrodes. These techniques, which include method and apparatus, are discussed in more detail below.

Figure 1:
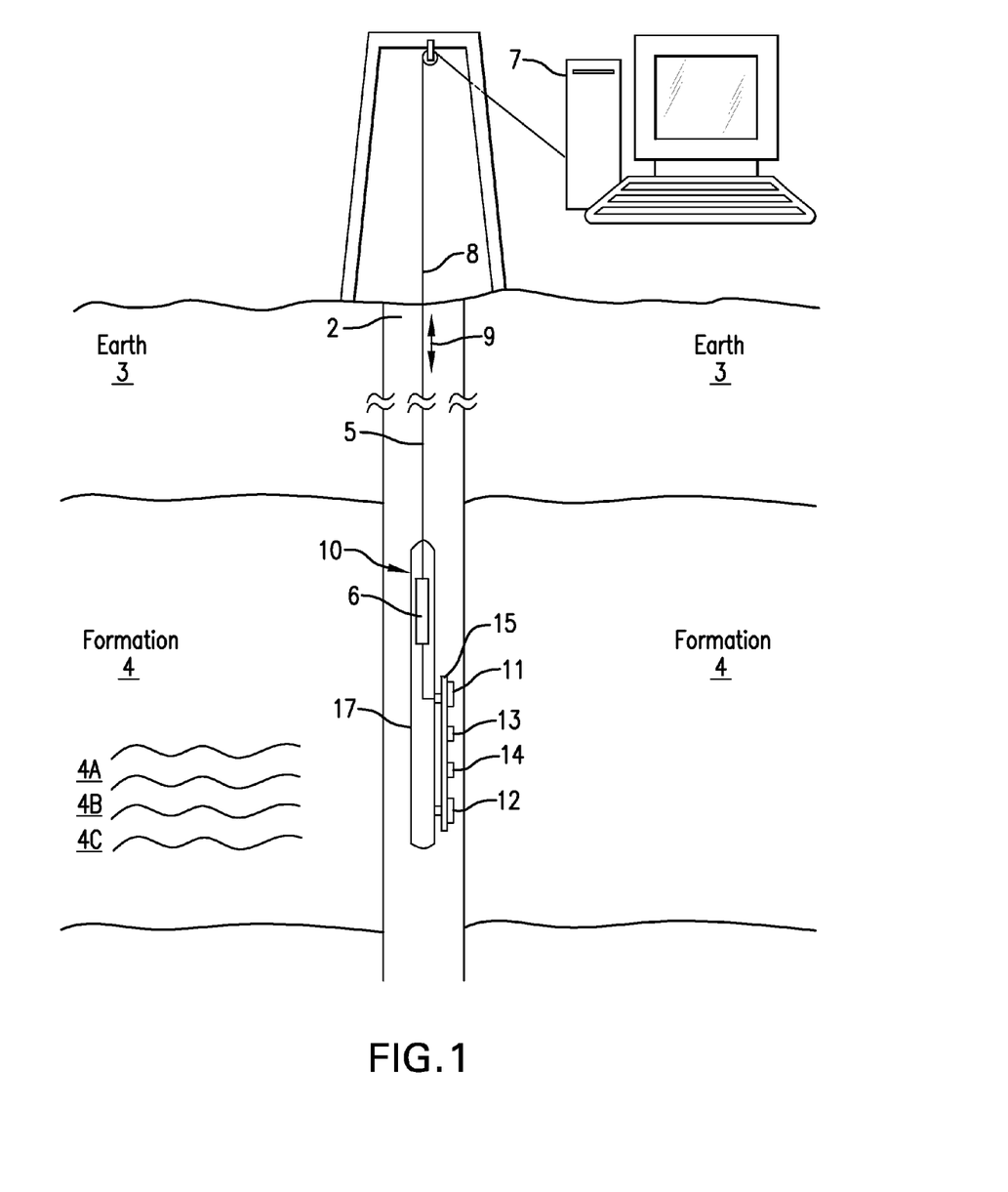
FIG. 1 illustrates an exemplary embodiment of a downhole resistivity tool disposed in a borehole penetrating the earth.

Reference may now be had to FIG. 1 illustrating an exemplary embodiment of a downhole tool 10 disposed in a borehole 2 penetrating the earth 3, which includes an earth formation 4. The earth formation includes layers 4A, 4B, and 4C. The downhole tool 10 is conveyed through the borehole 2 by a carrier 5. In the embodiment of FIG. 1, the carrier 5 is an armored wireline 8. Besides supporting the downhole tool 10 in the borehole 2, the wireline 8 can also provide communications (e.g., data 9) between the downhole tool 10 and a computer processing system 7 disposed at the surface of the earth 3. In logging-while-drilling (LWD) or measurement-while-drilling (MWD) embodiments, the carrier 5 can be a drill string. In order to operate the downhole tool 10 and/or provide a communications interface with the computer processing system 7, the downhole tool 10 includes downhole electronics 6.

Still referring to FIG. 1, the downhole tool 10 is configured to measure the resistivity, or its inverse conductivity, of the formation 4. To measure the resistivity, the downhole tool 10 includes a first transmitter electrode 11, a second transmitter electrode 12, a first current measurement electrode 13 (referred to as the first button electrode 13), and a second current measurement electrode 14 (referred to as the second button electrode 14), all disposed on a pad 15. This electrode configuration may be referred to as a two-button electrode configuration. The pad 15, in one embodiment, is configured to be extended from the downhole tool 10 to make contact with the wall of the borehole 2. The portion of the wall of the borehole 2 at which resistivity measurements are performed may be referred to as a conductive zone due to electrical currents being injected and measured in this zone using the above-mentioned electrodes. It can be appreciated that the downhole tool 10 can have a plurality of pads 15 arranged symmetrically or asymmetrically about the tool 10 so that they can extend in unison to contact the wall and provide mutual support to each other to maintain minimal standoff from the wall.

Figure 2:
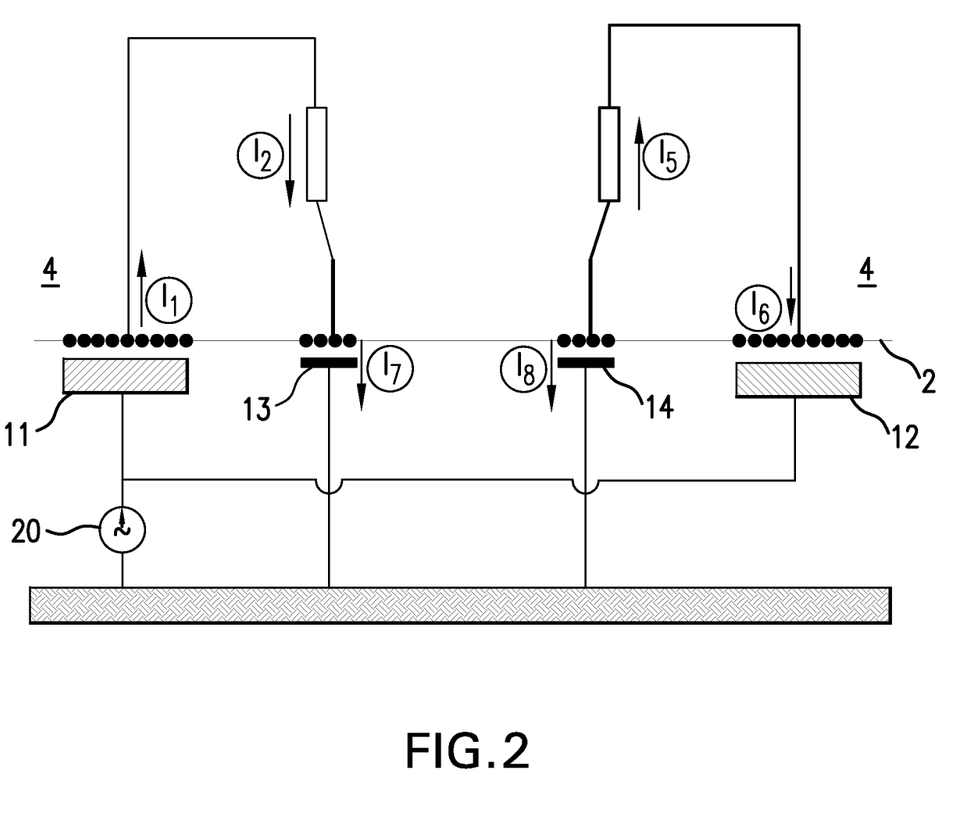
FIG. 2 illustrates an example of measuring formation resistivity without the presence of cross-currents.

Reference may now be had to FIG. 2 illustrating an example of measuring the resistivity of the formation 4 using the two-button electrode configuration without the presence of cross-currents. In FIG. 2, $I_1=I_2=I_7$ and $I_8=-I_5=-I_6$. The real parts of $I_7$ and $I_8$ are used to measure the resistivity of the formation 4. The first transmitter electrode 11 and the second transmitter electrode 12 are coupled to a transmitter voltage source 20. The transmitter voltage source 20 is configured to supply transmitter electrodes 11 and 12 with electric energy at one or more selected frequencies and/or amplitudes. Not shown is a receiver (such as a low impedance amplifier) coupled to each of the first button electrode 13 and the second button electrode 14. The very low impedance receiver is acting as an ammeter and is configured to receive electric currents $I_7$ and $I_8$, provide for its decoupling from following electronics and, if necessary, convert the received electric currents into respective electrical voltage for further processing. Non-limiting embodiments of measurements include voltage, current, and phase angle between the voltage and current.

Figure 3:
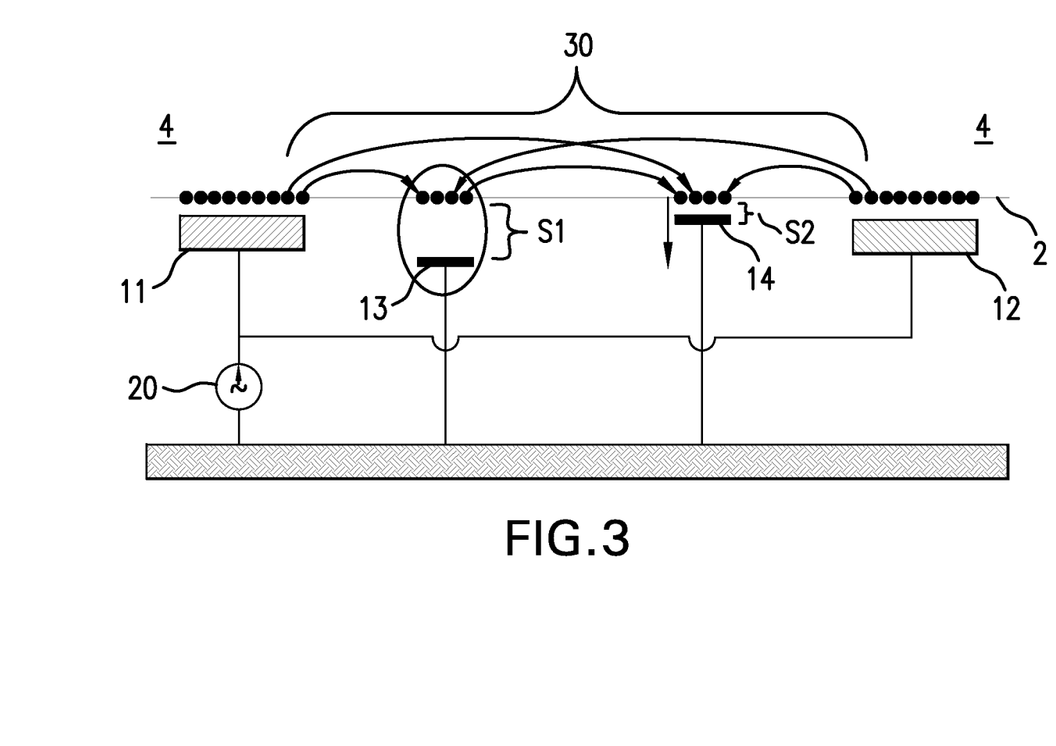
FIG. 3 illustrates an example of measuring formation resistivity with the presence of cross-currents.

Reference may now be had to FIG. 3 illustrating cross-currents 30 due to the standoff S1 of the first button electrode 13 not being the same as the standoff S2 of the second button electrode 14.

Figure 4:
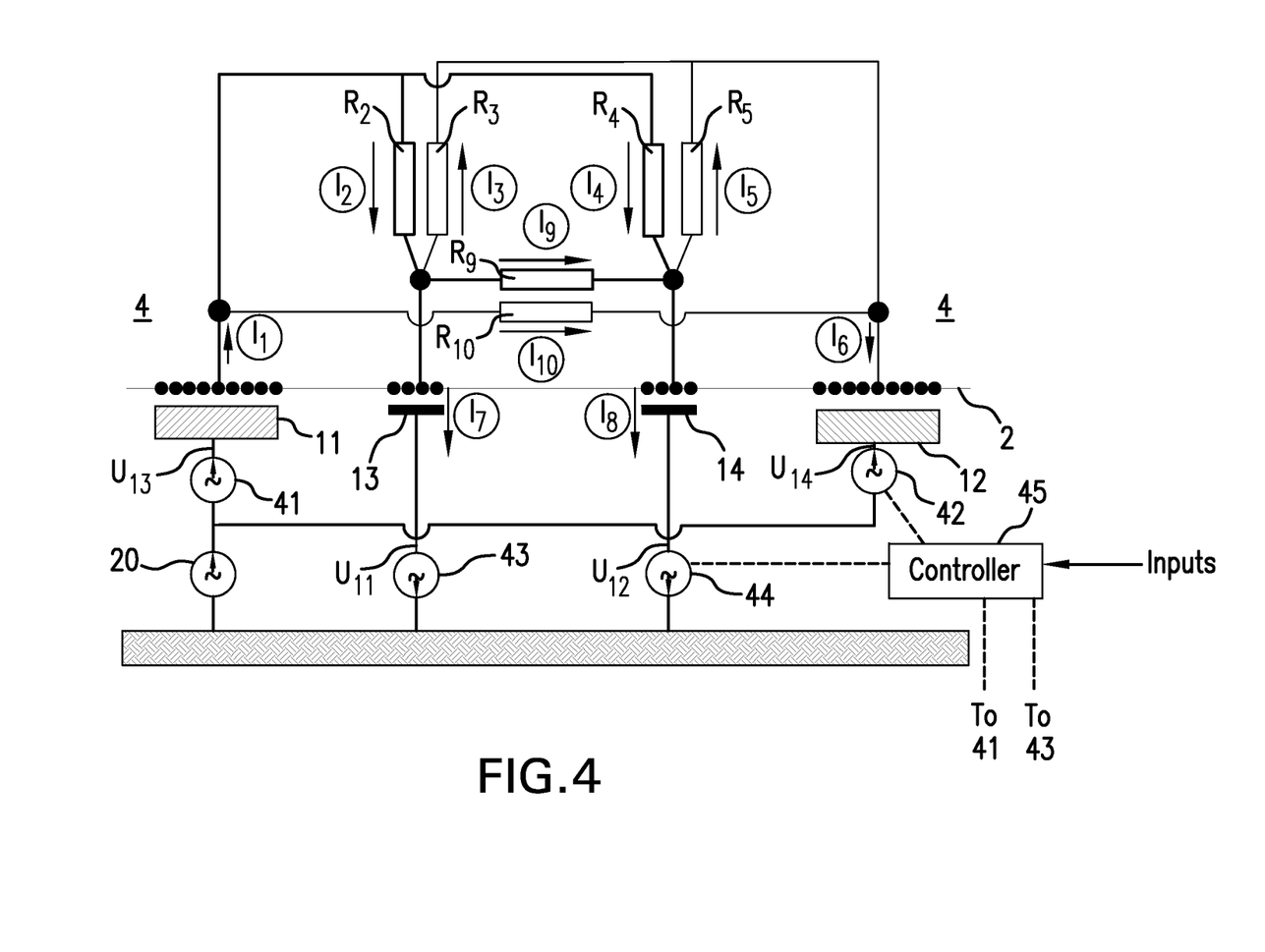
FIG. 4 illustrates an exemplary embodiment the resistivity logging tool with bucker amplifiers.

Reference may now be had to FIG. 4. FIG. 4 illustrates the two-button electrode configuration with labels for each of the measuring currents and the cross-currents. Also shown are a first transmitter bucker amplifier 41 coupled to the first transmitter electrode 11, a second transmitter bucker amplifier 42 coupled to the second transmitter electrode 12, a first measurement bucker amplifier 43 coupled the first button electrode 13, and a second measurement bucker amplifier 44 coupled to the second measurement electrode 14. The bucker amplifiers are configured to supply a voltage that is used to equalize the potentials of the areas located in front of the transmitter and button electrodes. Each of the bucker amplifiers 41, 42, 43, and 44 is coupled to a controller 45. The controller 45 is configured to control the voltage output of each of the bucker amplifiers 41, 42, 43, and 44. In addition, in one or more embodiments, the controller 45 is configured accept various electrical inputs from various parts (not shown) of the downhole tool 10 in order to determine an output voltage for each of the bucker amplifiers that results in equalizing the potentials of the areas in front of the transmitter and measurement electrodes. For example, current and/or voltage measurements at each of the transmitter and measurement electrodes can be used as the inputs. Outputs of other electrical sensors (not shown) may also provide input. For example, these other sensors may obtain electrical measurements along the wall of the borehole 2.

Equalizing the potentials of the areas located in front of the button electrodes includes the following actions:

(a) Measuring the capacitance between each button electrode and the formation 4, $C_j$, j=1, N, where N is the number of button electrodes. The capacitance can be measured by disconnecting all electrodes on the pad 15 but one and applying voltage between the remaining electrode and a metal mandrel 17 (shown in FIG. 1) of the downhole tool 10. Since the mandrel has a very large capacitance to the formation 4, this large capacitance will be in series with the capacitance of the button electrode and, thus, the measured impedance will be representative of the capacitance between the one button electrode and the formation 4.

(b) Introducing the measurement bucker amplifiers 43, 44 as shown in FIG. 4 for each of the button electrodes.

(c) Compensating for the cross-currents 30 by controlling additional complex voltages, $U_{be,j}$, applied to each button electrode by an associated bucker amplifier.

(d) Introducing a balance condition for the bucker amplifier voltage, $U_{be,j}$, and currents, $I_{e,j}$, $I_{e,j+1}$, in the neighboring button electrodes as follows:

$$U_{be,i} = -\frac{I_{e,i}}{i\omega C_i} + \frac{I_{e,i+1}}{i\omega C_{i+1}} \tag{1}$$

(e) Measuring the bucking complex voltage at each button electrode, $U_{be,j}$.

(f) Measuring the complex current flowing through each button electrode, $I_{e,j}$.

(g) Calculating the real part of the total impedance at each button electrode, $R_j$, $$R_j = \mathrm{Re}\left(\frac{U_{tr} + U_{be,j}}{I_{e,j}}\right) \tag{2}$$

where $U_{tr}$ is the voltage of an associated transmitter.

Equalizing the potentials of the areas located in front of the transmitter electrodes includes the following actions:

(h) Measuring the capacitance between each transmitter electrode and the formation 4, $CT_j$, j=1, NT, where NT is the number of transmitter electrodes.

(i) Introducing the transmitter bucker amplifiers 41, 42 as shown in FIG. 4 for each of the transmitter electrodes.

(j) Compensating for transmitter electrode cross-currents by controlling additional complex voltages, $U_{bt,j}$, applied to each transmitter electrode.

(k) The balance condition for each transmitter bucker amplifier voltage applied at transmitter electrodes, $U_{bt,j}$, and the transmitter electrode currents, $I_{t,j}$, $I_{t,j+1}$, is as follows:

$$U_{bt,i} = -\frac{I_{t,i}}{i\omega CT_i} + \frac{I_{t,i+1}}{i\omega CT_{i+1}} \tag{3}$$

(l) Measuring additional complex voltages at each transmitter electrode, $U_{bt,j}$.

(m) Calculating the real part of the total impedance at each transmitter electrode, $R_j$, $$R_j = \mathrm{Re}\left(\frac{U_{tr}^* + U_{be,j}}{I_{e,j}}\right) \tag{4}$$

where $U_{tr}^*$: is the voltage created on the borehole surface by each transmitter electrode (in one embodiment, such as in FIG. 4, $U_{tr}^*$: voltages are equal for all transmitters by definition).

Loop-equations can be written to electrically describe the operation of the two-button electrode configuration illustrated in FIG. 4. Equation (5) presents one example of the loop-equations using notation provided in FIG. 4.

$$\begin{bmatrix} \frac{1}{i\omega C_{E1}} & R_2 & 0 & 0 & 0 & 0 & \frac{1}{i\omega C_1} & 0 & 0 & 0 & -1 & 0 & -1 & 0 \\ 0 & -R_2 & 0 & R_4 & 0 & 0 & -\frac{1}{i\omega C_1} & \frac{1}{i\omega C_2} & 0 & 0 & 1 & -1 & 0 & 0 \\ 0 & 0 & R_3 & 0 & -R_5 & 0 & -\frac{1}{i\omega C_1} & \frac{1}{i\omega C_2} & 0 & 0 & 1 & -1 & 0 & 0 \\ 0 & 0 & 0 & 0 & R_5 & \frac{1}{i\omega C_{E2}} & 0 & -\frac{1}{i\omega C_2} & 0 & 0 & 0 & 1 & 0 & 1 \\ 0 & 0 & 0 & 0 & 0 & 0 & -\frac{1}{i\omega C_1} & \frac{1}{i\omega C_2} & R_9 & 0 & 1 & -1 & 0 & 0 \\ \frac{1}{i\omega C_{E1}} & 0 & 0 & 0 & 0 & \frac{1}{i\omega C_{E2}} & 0 & 0 & 0 & R_{10} & 0 & 0 & -1 & 1 \\ 1 & -1 & 0 & -1 & 0 & 0 & 0 & 0 & 0 & -1 & 0 & 0 & 0 & 0 \\ 0 & 0 & 1 & 0 & 1 & -1 & 0 & 0 & 0 & 1 & 0 & 0 & 0 & 0 \\ 0 & 1 & -1 & 0 & 0 & 0 & -1 & 0 & -1 & 0 & 0 & 0 & 0 & 0 \\ 0 & 0 & 0 & 1 & -1 & 0 & 0 & -1 & 1 & 0 & 0 & 0 & 0 & 0 \\ 0 & 0 & 0 & 0 & 0 & 0 & -\frac{1}{i\omega C_1} & \frac{1}{i\omega C_2} & 0 & 0 & 1 & -1 & 0 & 0 \\ 0 & 0 & 0 & 0 & 0 & 0 & 0 & 0 & 0 & 0 & 1 & 0 & 0 \\ \frac{1}{i\omega C_{E1}} & 0 & 0 & 0 & 0 & \frac{1}{i\omega C_{E2}} & 0 & 0 & 0 & 0 & 0 & 0 & -1 & 1 \\ 0 & 0 & 0 & 0 & 0 & 0 & 0 & 0 & 0 & 0 & 0 & 0 & 0 & 1 \end{bmatrix} \begin{bmatrix} I_1 \\ I_2 \\ I_3 \\ I_4 \\ I_5 \\ I_6 \\ I_7 \\ I_8 \\ I_9 \\ I_{10} \\ U_{11} \\ U_{12} \\ U_{13} \\ U_{14} \end{bmatrix} \tag{5}$$

$$= \begin{bmatrix} U_{tr} \\ 0 \\ 0 \\ -U_{tr} \\ 0 \\ 0 \\ 0 \\ 0 \\ 0 \\ 0 \\ 0 \\ 0 \\ 0 \\ 0 \\ 0 \end{bmatrix}$$

where:
$C_{E1}$ is the capacitance between the first transmitter electrode 11 and the formation 4;
$C_{E1}$ is the capacitance between the second transmitter electrode 12 and the formation 4;
$C_1$ is the capacitance between the first button electrode 13 and the formation 4;
$C_2$ is the capacitance between the second button electrode 14 and the formation 4;
$U_{11}$ is the voltage at the output of the first measurement bucker amplifier 43;
$U_{12}$ is the voltage at the output of the second measurement bucker amplifier 44;
$U_{13}$ is the voltage at the output of the first transmitter bucker amplifier 41;
$U_{14}$ is the voltage at the output of the second transmitter bucker amplifier 42; and
$U_{tr}$ is the voltage output of the transmitter 20.

Because equation (5) electrically describes operation of the two-button electrode configuration, equation (5) can be used to obtain the various electrical parameter values needed to determine the resistivity of the formation 4. For example, by using the bucker amplifiers 41, 42, 43, and 44, the cross-currents can be driven to near zero. Thus, $I_4$, $I_5$, $I_9$, and $I_{10}$ can be set to zero and $I_1=I_2=I_7$ and $I_8=-I_5=-I_6$ (as shown in FIG. 2 with no cross-currents). The real parts of $I_7$ and $I_8$ can be used to determine the formation resistivity.

Figure 5:
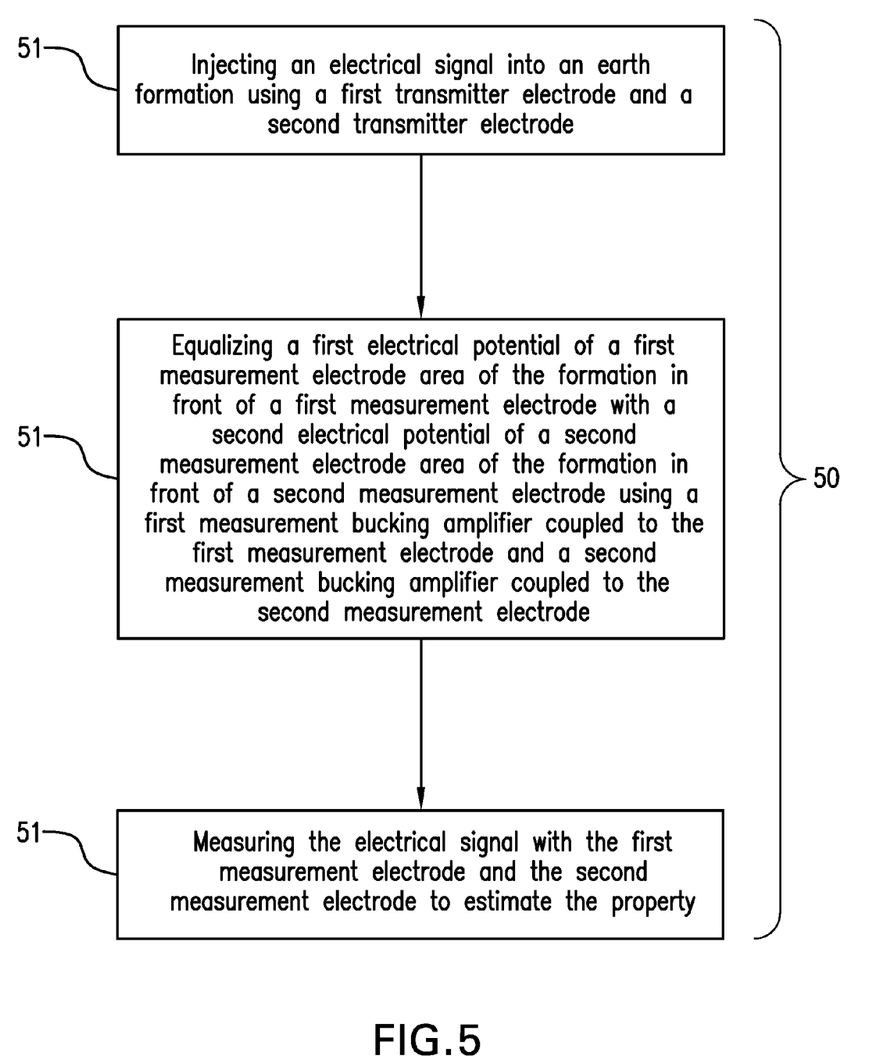
FIG. 5 presents one example of a method for estimating a property of an earth formation.

FIG. 5 presents one example of a method 50 for estimating a property of a formation. The method 50 calls for (step 51) injecting an electrical signal (such as electrical current) into the formation using a first transmitter electrode and a second transmitter electrode. Further, the method 50 calls for (step 52) equalizing a first electrical potential of a first measurement electrode area of the formation in front of a first measurement electrode with a second electrical potential of a second measurement electrode area of the formation in front of a second measurement electrode using a first measurement bucking amplifier coupled to the first measurement electrode and a second measurement bucking amplifier coupled to the second measurement electrode. Step 52 can also include equalizing a potential of each area of the formation in front of the first transmitter electrode and the second transmitter electrode with the areas in front of the first measurement electrode and the second measurement electrode. Further, the method 50 calls for (step 53) measuring the electrical signal (such as the electrical current) using the first measurement electrode and the second measurement electrode to estimate the formation property.

It can be appreciated that more than two transmitter electrodes and/or more than two measurement electrodes can be used in the downhole tool 10. The techniques disclosed herein apply to equalizing the potential of areas in front of all transmitter electrodes and/or all measurement electrodes.

Another new apparatus and method are disclosed that do not require the use of bucking amplifiers coupled to electrodes although bucking amplifiers can be used in certain embodiments to impress a certain voltage on an electrode. In this new apparatus and method, a plurality of electrodes, such as the transmitter electrodes 11 and 12 and the current measurement electrodes 13 and 14 shown in FIG. 1, are used to inject electrical current and/or measure electrical current resulting from current injections. If an electrode is used to inject current in a formation measurement then that electrode is not used to measure electrical current for that particular formation measurement.

A series or sequence of formation measurements, which may be referred to as controlled modes, are performed where the voltage of one or more of the electrodes used to measure electrical current is known. In one or more embodiments, the one or more electrodes used to measure electrical current are kept at zero potential such as by being coupled to ground.

Each formation measurement in the series uses a unique subset of electrodes in the plurality of electrodes to inject current into the earth formation. One or more electrodes not used for injecting current are used to measure electrical current resulting from the injecting of current.

Because the response of a system including the apparatus and the earth formation is linear, the controlled mode measurements are summed under the superposition principle. Currents measured by a particular electrode are summed such that the summed currents for that particular electrode are substantially in phase with the voltage applied to the one or more electrodes injecting current. That is, any complex components of measured currents in the controlled mode measurements are canceled out in the sum of the currents. Hence, the summed currents represent the resistivity or conductivity of the earth formation.

In one or more embodiments, electrical current loop equations similar to the equations presented in equation 5 may be written for electrical current loops that include electrical currents flowing in the plurality of electrodes. Current loop equations that are independent of or orthogonal to the other current loop equations can be scaled so that the complex components of the measured currents for a particular electrode cancel each other out with the result that the summed currents for that particular electrode is a real number (i.e., current in phase with applied voltage for current injection).

The electrical current loop equations can be notated using matrix algebra. In one or more embodiments, the electrical current loop equations can be notated similar to the loop equations in equation 5. In one or more embodiments, the electrical current loop equations can be notated as a matrix equation [Z] [I]=[V] where [Z] is an impedance matrix, [I] is a current matrix representing currents in the current loops, and [V] is a voltage matrix. The values of [V] are generally known for each controlled mode measurement. In addition, one or more independent electrical current loop equations may be scaled in order for the sum of the measured currents to be a real number.

In one embodiment, a set of controlled mode measurements includes sequentially applying a unit potential to each electrode while the other electrodes are used for measuring current and are kept at a zero or ground potential. The number of controlled mode measurements, thus, equals the number of electrodes.

It can be appreciated that in lieu of a measuring electrode being kept at zero potential during a controlled mode measurement, the measuring electrode can also be kept at a known potential such as with a bucking amplifier while a current measurement is made.

Figure 6:
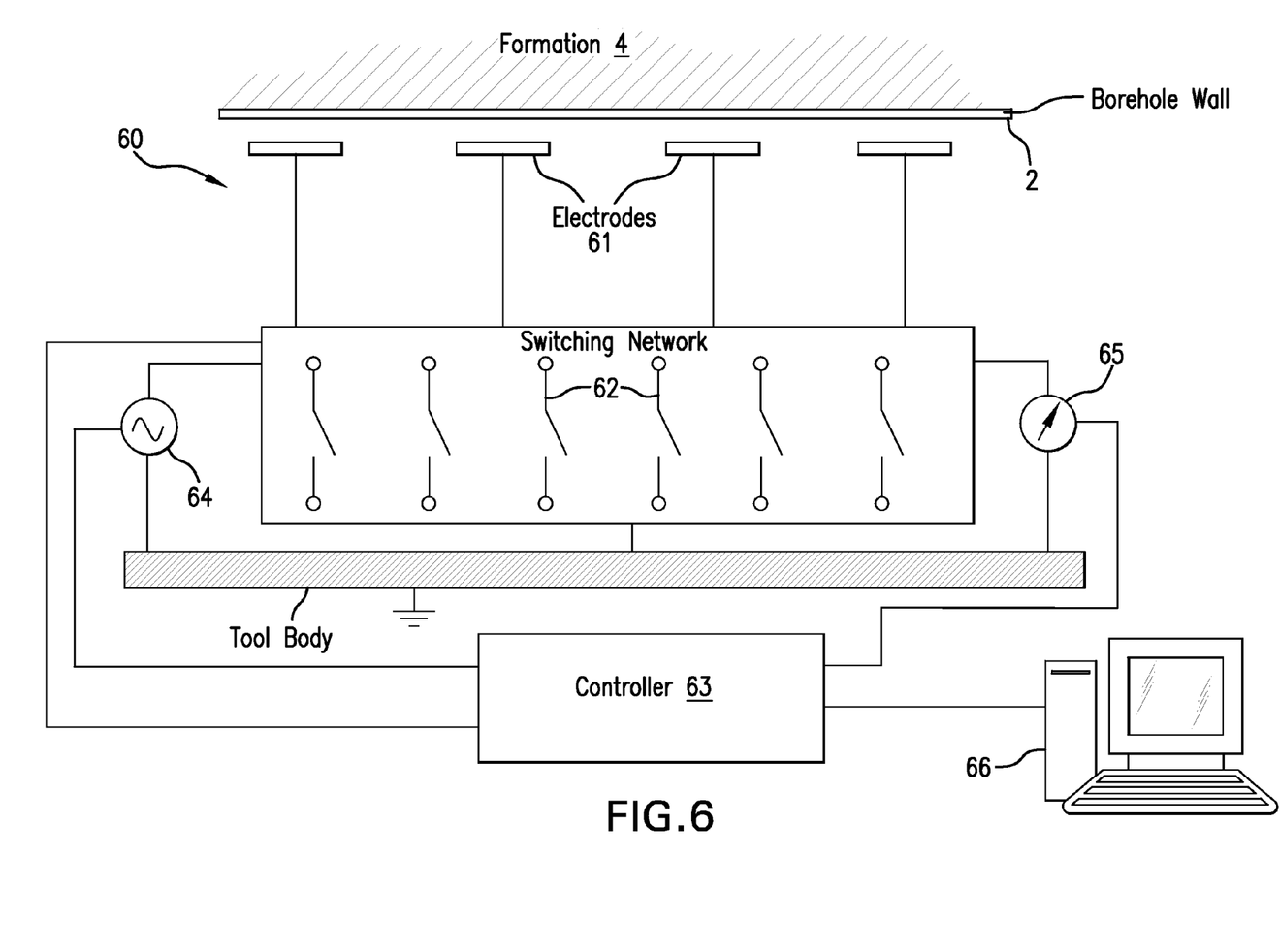
FIG. 6 depicts aspects of a downhole tool for performing a series of controlled mode measurements.

Reference may be had to FIG. 6 depicting aspects of a downhole tool 60 used for controlled mode resistivity measurements of the earth formation 4. The tool 60 includes a plurality of electrodes 61 such as the electrodes 11-14 shown in FIG. 1. Each electrode in the plurality of electrodes 61 is coupled to a network of switching components 62. In one or more embodiments, the network of switching components 62 is controlled by a controller 63 that can select which electrodes (i.e., unique subset of electrodes) in the plurality of electrodes 61 will be used to inject current into the formation 4 and which electrodes will be used to measure current resulting from the current injection for a particular controlled mode measurement. A voltage source 64 is configured to apply voltage to one or more electrodes selected to inject current into the formation 4 for a particular controlled mode measurement. An electrical sensor 65 is configured to sense current or a parameter related to current in one or more electrodes selected to measure current. The voltage source 64 and the electrical sensor 65 are coupled to the selected electrodes via the network of switching components 62. A computer processing system 66 is coupled to the network of switching components 62, the voltage source 64, the electrical sensor 65, and the controller 63. The computer processing system 66 can be disposed downhole or at the surface of the earth 3. In one or more embodiments, the computer processing system 66, the network of switching components 62, and the controller 63 can be combined into one unit or distributed over several units.

Figure 7:
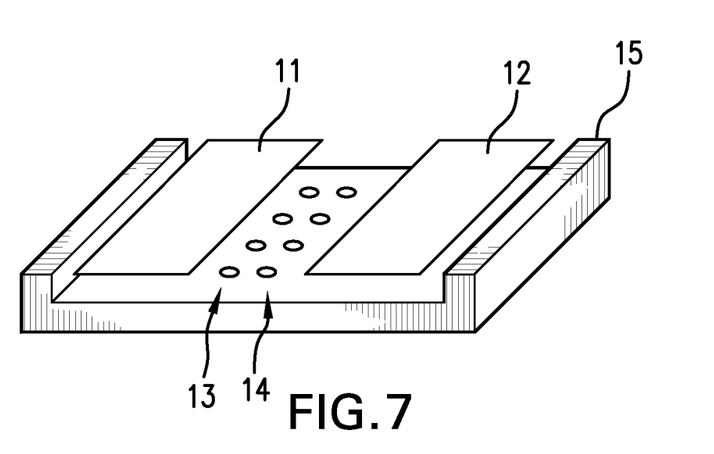
FIG. 7 depicts aspects of the downhole resistivity tool having two rows of button electrodes disposed between two transmitter electrodes.
Figure 8:
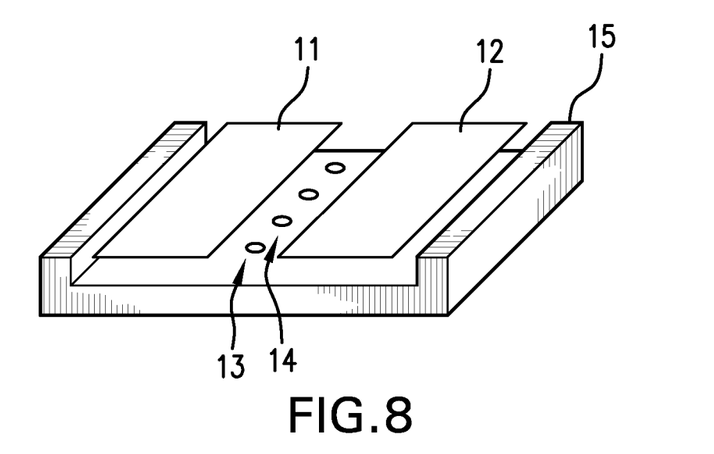
FIG. 8 depicts aspects of the downhole resistivity tool having a single row of button electrodes disposed between two transmitter electrodes.

It can be appreciated that each of the electrodes 11-14 in the tool 10 can represent more than one electrode and that these electrodes can have various configurations. For example, the tool 10 in one embodiment can have a plurality of button electrodes 13 arranged in a single row and a plurality of button electrodes 14 arranged in another single row with the rows disposed between the transmitter electrodes 11 and 12 as shown in FIG. 7. In this example, the rows are symmetrical to each other and the electrodes 11-14 exhibit symmetry along an axis between the two rows such as a longitudinal axis of the pad 15. In another example, a plurality of button electrodes (i.e. button electrodes 13 and/or 14) is arranged in a single row between the transmitter electrodes 11 and 12 as shown in FIG. 8.

Figure 9:
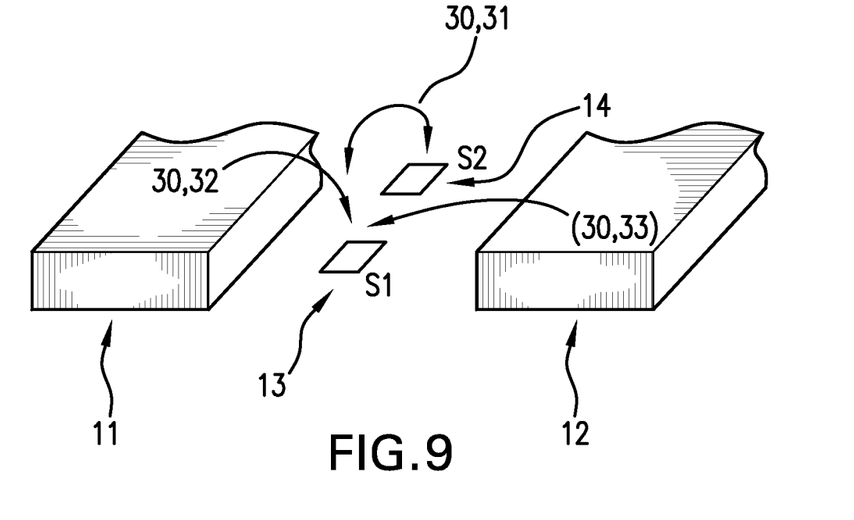
FIG. 9 depicts aspects of cross-currents in the downhole resistivity tool having a single row of button electrodes with different standoffs.

In the embodiment with one single row of button electrodes (e.g., FIG. 8), the transmitter currents 30 are present as shown in FIG. 9. The transmitter currents 30 include transmitter currents 32 and 33 transmitted by electrodes 11 and 12, respectively. In the case of even standoffs (S1=S2) for the button electrodes 13 and 14, transmitter currents 32 and 33 are equal to each other as long as pad and borehole symmetry are maintained. Also with these conditions, there will be no cross-current 31 between button electrodes 13 and 14. However, in the case of uneven standoffs (S1≠S2), the transmitter currents 32 and 33 are different from each other and the cross-current 31 appears. This results in image distortions requiring correction using the teachings disclosed herein. For example, the number of respective bucker amplifiers used is adjusted to reflect the number of actual button electrodes used in a configuration. Similarly, the matrix 5 is changed to reflect the actual configuration of the electrodes in the tool 10.

In support of the teachings herein, various analysis components may be used, including a digital and/or an analog system. For example, the downhole electronics 6, the computer processing system 7 or 66, the controller 45 or 66, or the network of switching components 62 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to a first device being coupled directly to a second device or indirectly through an intermediate device.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. An apparatus for estimating a property of an earth formation penetrated by a borehole, the apparatus comprising:
   a carrier configured to be conveyed through the borehole;
   a plurality of electrodes disposed at the carrier and configured to inject an electrical current into the earth formation using an applied voltage and/or measure electrical current resulting from an injection of the electrical current; and
   a processor configured to:
      perform a series of formation measurements, each formation measurement comprising:
         injecting electrical current into the earth formation using a unique subset of electrodes in the plurality of electrodes; and
         measuring electrical current in the earth formation using one or more electrodes in the plurality of electrodes not used for the injecting electrical current in the formation measurement;
      sum the electrical currents measured for each electrode that measured electrical current for the series of formation measurements wherein the sum of electrical currents for at least one electrode that measured electrical current is substantially in phase with the applied voltage; and
      use the sum of electrical currents that are substantially in phase with the applied voltage to estimate the property.

2. The apparatus according to claim 1, further comprising a controller coupled to the processor and configured to apply the applied voltage to the unique subset of electrodes used for injecting electrical current into the earth formation for each formation measurement.

3. The apparatus according to claim 2, wherein the controller comprises a network of switching components configured to select the unique subset of electrodes used for injecting the electrical current into the earth formation.

4. The apparatus according to claim 1, further comprising a sensing circuit coupled to the processor and configured to measure the electrical current in the earth formation using the one or more electrodes in the plurality of electrodes not used for the injecting electrical current in the formation measurement.

5. The apparatus according to claim 1, wherein the sensing circuit comprises a network of switching components configured to couple the one or more electrodes not used for the injecting electrical current in the formation measurement to an electrical sensor for measuring electrical current.

6. The apparatus according to claim 1, wherein the property is resistivity or conductivity or combination thereof.

7. The apparatus according to claim 1, wherein the property is a location of a boundary between layers of the earth formation.

8. The apparatus according to claim 1, wherein the processor is further configured to scale a measured electrical current in an independent electrical circuit through the earth formation prior to summing, the measured electrical current being scaled such that the sum of electrical currents for at least one electrode that measured electrical current is substantially in phase with the applied voltage.

9. The apparatus according to claim 1, wherein the carrier comprises at least one of a wireline, a slickline, a drill string, and coiled tubing.

10. A method for estimating a property of an earth formation penetrated by a borehole, the method comprising:
    conveying a carrier through the borehole, the carrier comprising a plurality of electrodes configured to inject an electrical current into the earth formation using an applied voltage and/or measure electrical current resulting from injections of the electrical current;
    performing a series of formation measurements using a processor, each formation measurement comprising:
       injecting electrical current into the earth formation using a unique subset of electrodes in the plurality of electrodes; and
       measuring electrical current in the earth formation using one or more electrodes in the plurality of electrodes not used for the injecting electrical current in the formation measurement;
    summing the electrical currents measured for each electrode that measured electrical current for the series of formation measurements wherein the sum of electrical currents for at least one electrode that measured electrical current is substantially in phase with the applied voltage; and
    using the sum of electrical currents that are substantially in phase with the applied voltage to estimate the property.

11. The method according to claim 10, further comprising impressing a voltage on at least one of the electrodes used for measuring electrical current.

12. The method according to claim 10, further comprising scaling a measured electrical current in an independent electrical circuit through the earth formation prior to summing, the measured electrical current being scaled such that the sum of electrical currents for at least one electrode that measured electrical current is substantially in phase with the applied voltage.

13. The method according to claim 10, further comprising generating an electrical loop equation for each formation measurement, each electrical loop equation representing electrical current flowing though the earth formation, and establishing a set of loop equations from the series of formation measurements.

14. The method according to claim 13, further comprising populating a matrix equation of the form [Z][I]=[V] using the set of electrical loop equations where [Z] is a matrix of loop impedances, [I] is a matrix of loop currents, and [V] is a matrix of voltages.

15. The method according to claim 14, wherein each voltage in the matrix of voltages is known.

16. The method according to claim 15, wherein one or more of the known voltages is impressed on one or more of the electrodes used for measuring electrical current.

17. The method according to claim 15, further comprising determining one or more independent equations in the matrix equation.

18. The method according to claim 17, further comprising scaling the one or more independent equations such that the sum of electrical currents for at least one electrode that measured electrical current is substantially in phase with the applied voltage.

19. A non-transitory computer readable medium comprising computer executable instructions for estimating a property of an earth formation penetrated by a borehole by implementing a method comprising:

injecting electrical current into the earth formation using a unique subset of electrodes in a plurality of electrodes disposed in the borehole;

measuring electrical current in the earth formation using one or more electrodes in the plurality of electrodes not used for the injecting electrical current in the formation measurement;

summing the electrical currents measured for each electrode that measured electrical current for the series of formation measurements wherein the sum of electrical currents for at least one electrode that measured electrical current is substantially in phase with the applied voltage; and using the sum of electrical currents that are substantially in phase with the applied voltage to estimate the property.

* * * * *